US010239155B1

(12) United States Patent
Stewart et al.

(10) Patent No.: US 10,239,155 B1
(45) Date of Patent: Mar. 26, 2019

(54) MULTIPLE LASER BEAM PROCESSING

(71) Applicant: The Boeing Company, Chicago, IL (US)

(72) Inventors: Alan F. Stewart, Seattle, WA (US); Anthony J. Kay, Moorpark, CA (US); Louis K. Zeldin, Albuquerque, NM (US); Andrea Koumvakalis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 409 days.

(21) Appl. No.: 14/265,549

(22) Filed: Apr. 30, 2014

(51) Int. Cl.
*B23K 26/06* (2014.01)
*B23K 26/03* (2006.01)

(52) U.S. Cl.
CPC ......... *B23K 26/0608* (2013.01); *B23K 26/03* (2013.01); *B23K 26/0626* (2013.01); *B23K 26/0665* (2013.01)

(58) Field of Classification Search
CPC ............ B23K 26/0626; B23K 26/0069; B23K 26/0673; B23K 26/0643; B23K 26/0676
USPC .............. 219/121.6, 121.61, 121.76, 121.78, 219/121.79
See application file for complete search history.

(56) References Cited

U.S. PATENT DOCUMENTS

| | | | | |
|---|---|---|---|---|
| 4,564,739 A * | 1/1986 | Mattelin | ............... | B23K 26/067 219/121.68 |
| 5,302,798 A * | 4/1994 | Inagawa | .............. | B23K 26/067 219/121.7 |
| 5,399,835 A * | 3/1995 | Nakata | ................... | B23K 26/04 219/121.78 |
| 5,742,028 A | 4/1998 | Mannava et al. | | |
| 5,805,748 A * | 9/1998 | Izawa | .................... | G02B 27/09 372/71 |
| 6,005,717 A * | 12/1999 | Neuberger | ............. | G02B 27/09 359/618 |
| 6,240,116 B1 * | 5/2001 | Lang | .................. | G02B 27/0905 372/108 |
| 6,353,502 B1 * | 3/2002 | Marchant | ............... | G02B 3/005 359/619 |
| 6,373,876 B1 | 4/2002 | Dulaney et al. | | |
| 6,410,884 B1 * | 6/2002 | Hackel | .................. | B21D 11/20 219/121.6 |
| 6,462,306 B1 * | 10/2002 | Kitai | .................. | B23K 26/0643 219/121.7 |

(Continued)

OTHER PUBLICATIONS

Ecault, et al., A Study of Composite Material Damage Induced by Laser Shock Waves, Composites: Part A 53 (2013) 54-64.

(Continued)

*Primary Examiner* — Jimmy Chou
(74) *Attorney, Agent, or Firm* — Kunzler, P.C.

(57) ABSTRACT

Described herein is a system for processing a workpiece that includes a plurality of lasers that each produces a laser beam pulse. The system also includes a laser control module that sequences temporal characteristics of the laser beam pulses. Additionally, the system includes a laser beam compensation module that shapes a near field intensity profile of at least one of the laser beam pulses and adjusts a path length of at least one of the laser beam pulses. The system also includes at least one laser beam position element that combines the laser beam pulses to produce a combined laser beam pulse at a surface of the workpiece.

14 Claims, 8 Drawing Sheets

(56) References Cited

U.S. PATENT DOCUMENTS

| | | | |
|---|---|---|---|
| 6,521,866 B1* | 2/2003 | Arai | B23K 26/0626 219/121.7 |
| 6,664,506 B2 | 12/2003 | Clauer et al. | |
| 6,670,578 B2 | 12/2003 | Hackel et al. | |
| 6,987,240 B2* | 1/2006 | Jennings | B23K 26/032 219/121.78 |
| 7,068,690 B2* | 6/2006 | Okazaki | H01S 5/4012 372/36 |
| 7,078,650 B2* | 7/2006 | Gross | B23K 26/067 219/121.71 |
| 7,310,186 B2* | 12/2007 | Lerner | G02B 27/0905 359/641 |
| 7,551,652 B1* | 6/2009 | Jiang | H01S 3/0675 372/12 |
| 7,674,999 B2* | 3/2010 | Jennings | B23K 26/0613 219/121.65 |
| 7,970,199 B2* | 6/2011 | Yoshida | G01B 11/2441 356/497 |
| 8,148,663 B2* | 4/2012 | Adams | B23K 26/0604 219/121.61 |
| 2001/0050931 A1* | 12/2001 | Iso | B23K 26/06 372/25 |
| 2003/0196996 A1* | 10/2003 | Jennings | B23K 26/032 219/121.73 |
| 2004/0056010 A1* | 3/2004 | Ho | G01B 11/272 219/121.78 |
| 2004/0114250 A1* | 6/2004 | Kato | G02B 3/0062 359/626 |
| 2004/0198028 A1* | 10/2004 | Tanaka | B23K 26/0604 438/487 |
| 2005/0067388 A1* | 3/2005 | Sun | B23K 26/0613 219/121.61 |
| 2005/0120803 A1* | 6/2005 | Sokol | G01N 29/2412 73/801 |
| 2005/0218124 A1* | 10/2005 | Jennings | B23K 26/032 219/121.65 |
| 2006/0054607 A1* | 3/2006 | Wu | B23K 26/0069 219/121.83 |
| 2006/0198402 A1* | 9/2006 | Hodgson | B23K 26/0622 372/22 |
| 2006/0261051 A1* | 11/2006 | Unrath | B23K 26/0604 219/121.76 |
| 2006/0262408 A1* | 11/2006 | Kato | G02B 27/0994 359/618 |
| 2007/0076215 A1* | 4/2007 | Toida | A61B 5/0066 356/497 |
| 2008/0023447 A1* | 1/2008 | Holmgren | B23K 26/04 219/121.6 |
| 2008/0121627 A1* | 5/2008 | Bruland | B23K 26/0613 219/121.67 |
| 2008/0164240 A1* | 7/2008 | Cordingley | B23K 26/0604 219/121.61 |
| 2008/0210671 A1* | 9/2008 | Jennings | B23K 26/0613 219/121.61 |
| 2009/0120915 A1* | 5/2009 | Tagawa | B23K 26/032 219/121.62 |
| 2009/0242522 A1* | 10/2009 | Baird | B23K 26/03 219/121.61 |
| 2010/0089881 A1* | 4/2010 | Bruland | B23K 26/0613 219/121.68 |
| 2010/0116801 A1* | 5/2010 | Mukai | B08B 7/0042 219/121.85 |
| 2012/0061356 A1* | 3/2012 | Fukumitsu | B23K 26/0057 219/121.61 |
| 2012/0312790 A1* | 12/2012 | Moffatt | B23K 26/0626 219/121.6 |
| 2012/0325784 A1* | 12/2012 | Moffatt | B23K 26/03 219/121.61 |
| 2013/0172862 A1* | 7/2013 | Suckewer | A61B 18/203 606/9 |
| 2013/0277340 A1* | 10/2013 | Liu | B23K 26/127 219/121.61 |

OTHER PUBLICATIONS

Fournier et al, Mechanical Effects Induced by Shock Waves Generated by High Energy Laser Pulses, J. Phys. III France 1, Sep. 1991, pp. 1467-1480.

Berthe, et al., State-of-the-art laser adhesion test (LASAT), Nondestructive Testing and Evaluation, Taylor & Francis, vol. 26, Nos. 3-4, Sep.-Dec. 2011, 303-317.

Devaux, et al., Generation of Shock Waves by Laser-Induced Plasma in Confined Geometry, Journal of Applied Physics, vol. 74 (4), Aug. 15, 1993, pp. 2268-2273.

McKie, et al., Rapid Inspection of Composites Using Laser-Based Ultrasound, Rockwell International Science Center, Review of Progress in Quantitative Nondestructive Evaluation, vol. 12, D.O. Thompsen and D.E. Chimenti Plenum Press, New York 1993, pp. 507-516.

Fabbro, et al., Physical Study of Laser-Produced Plasma in Confined Geometry, Journal of Applied Physics, vol. 68 (2), Jul. 15, 1990, pp. 775-784.

* cited by examiner

MULTIPLE LASER BEAM PROCESSING

FIELD

This disclosure relates generally to material processing, and more particularly to processing a material using multiple laser beams.

BACKGROUND

Laser shock processing techniques are used to modify a material by applying a laser beam onto the work surface of the material. Depending on the characteristics of the laser beam, the energy imparted to the material by the laser beam can alter the characteristics of the material in various ways for achieving a desired effect or condition (e.g., various disparate processing results). For example, laser shock peening techniques are used to impart localized compressive residual stresses within a material. The compressive residual stresses act to resist fatigue failure of the material over time. Other laser shock processing techniques are used to alter the formation of a material in other ways, such as to remove surface layers of the material. Additionally, some laser shock processing techniques are used to generate a shockwave through a material for creating or detecting defects in the material.

Generally, the laser beam utilized in laser shock processing techniques may be generated from a single, customized laser specifically tailored to produce a laser beam with relatively fixed characteristics for achieving a dedicated processing application. Accordingly, such application-specific lasers can be complex, expensive, and limited to single mode operation to produce a laser beam with a limited range of characteristics. Often, due to the complexity and customization of application-specific lasers, modifications to the lasers can also be difficult. Additionally, reliability, replaceability, and reparability of application-specific lasers may lead to a high cost of ownership.

SUMMARY

The subject matter of the present application has been developed in response to the present state of the art, and in particular, in response to the shortcomings of laser shock processing techniques. Accordingly, the subject matter of the present application has been developed to provide an apparatus, system, and method that overcome at least some of the above-discussed shortcomings of prior art techniques. More particularly, in some embodiments, described herein is an apparatus, system, and method that combines the output of a plurality of lasers to produce a combined laser beam pulse (e.g., macropulse) for processing, such as forming and inspection of, a material under test. In some implementations, each of the plurality of lasers is a generic or non-application-specific laser, which improves the reliability, replaceability, and reparability of the lasers, which leads to a lower cost of ownership. Further, the characteristics of the individual outputs of the lasers can be synchronized to produce a combined laser beam with any of various characteristics for achieving any of various disparate processing results. Accordingly, a laser processing system of the present disclosure is not limited to producing one particular processing result as with some prior art systems.

According to one embodiment, a system for processing a workpiece includes a plurality of lasers that each produces a laser beam pulse. The system also includes a laser control module that sequences temporal characteristics of the laser beam pulses. Additionally, the system includes a laser beam compensation module that shapes a near field intensity profile of at least one of the laser beam pulses and adjusts a path length of at least one of the laser beam pulses. The system also includes at least one laser beam position element that combines the laser beam pulses to produce a combined laser beam pulse at a surface of the workpiece.

In some implementations of the system, each laser beam pulse has a first energy. The combined laser beam pulse having a second energy greater than the first energy. The laser control module controls the temporal characteristics and sequencing of the laser beam pulses based on a desired second energy of the combined laser beam pulse. The first energy of each laser beam pulse can be the same in certain implementations. The first energy of at least one of the laser beam pulse can be different than the first energy of at least one other of the laser beam pulses in certain implementations.

According to some implementations of the system, sequencing the temporal characteristics of the laser beam pulses includes temporally staggering the laser beam pulses. A delay between the laser beam pulses can be set according to at least one of a desired duration and peak power P(t) of the combined laser beam pulse.

In certain implementations of the system, the at least one laser beam position element combines the laser beam pulses to produce the combined laser beam pulse by redirecting the laser beam pulses to converge at a single point on the surface of the workpiece. The combined laser beam pulse may induce a shockwave through the workpiece. The system can further include a confining material that overlays the surface of the workpiece. The confining material can facilitate a peening of the workpiece.

According to certain implementations of the system, the laser beam position element includes a plurality of scan heads each receiving a respective one of the laser beam pulses. Each scan head is separately operable to adjust a direction of the laser beam pulse received by the scan head.

In some implementations, the system includes at least one laser beam diagnostic element that detects at least one characteristic of the laser beam pulses. The laser control module adjusts sequencing of the temporal characteristics of the laser beam pulses based at least partially on the at least one characteristic detected by the at least one laser beam diagnostic element. A characteristic of the laser beam pulses detected by the at least one laser beam diagnostic element can include a power output. According to certain implementations, the system can further include at least one laser beam compensation element that changes at least one of a spatial shape and path length of each laser beam pulse.

According to another embodiment, a method for processing a workpiece includes generating a plurality of laser beam pulses from a plurality of lasers, temporally offsetting the plurality of laser beam pulses, and combining the plurality of laser beam pulses into a combined laser beam pulse at a surface of the workpiece. In some implementations, the method can include modifying a microstructure of the workpiece with the combined laser beam pulse. In certain implementations, the method may include inducing a shockwave through the workpiece with the combined laser beam pulse.

In some implementations, the method includes monitoring characteristics of the laser beam pulses. Temporally offsetting the plurality of laser beam pulses can be based on monitored characteristics of the laser beam pulses. In yet certain implementations, the method includes modifying at least one of an intensity distribution and path length of the laser beam pulses based on at least one of characteristics of the surface of the workpiece and a location of the surface of the workpiece relative to the plurality of lasers. The method may additionally include redirecting the plurality of laser beam pulses toward the surface of the workpiece to converge at the surface of the workpiece.

According to another embodiment, an apparatus for controlling processing of a workpiece includes a laser control module that controls timing of a plurality of temporally-overlapping laser beam pulses generated by a plurality of lasers. The apparatus also includes a laser beam compensation module that controls at least one of a spatial shape and path length of the plurality of temporally-overlapping laser beam pulses. Further, the apparatus includes a laser beam position module that controls a direction of the plurality of temporally-overlapping laser beam pulses to converge at a surface of the workpiece.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
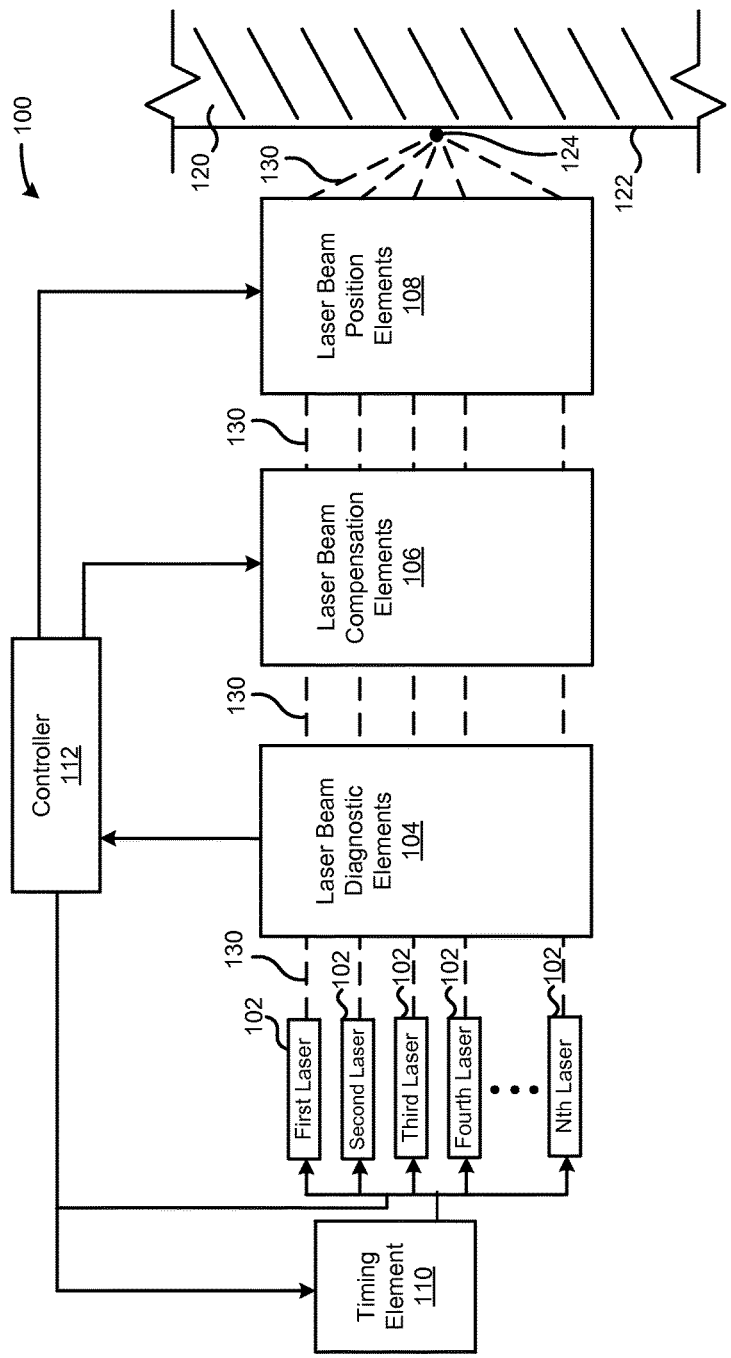
FIG. 1 is a schematic block diagram of a laser processing system for processing a material according to one embodiment.

Referring to FIG. 1, and according to one embodiment, a laser processing system 100 for processing a workpiece 120 is shown. The laser processing system 100 includes lasers 102, laser beam diagnostic elements 104, laser beam compensation elements 106, and laser beam positioning elements 108. Generally, each laser 102 generates a laser beam pulse 130 or output pulse that is temporally sequenced with the laser beams pulses 130 of the other lasers by a timing element 110 that receives feedback from the laser beam diagnostic elements 104. The laser beam pulses 130 are individually shaped, the path lengths of the laser beam pulses 130 are individually adjusted by the laser beam compensation elements 106, and the laser beam pulses are individually positioned by the laser beam position elements 108 to form a combined laser beam pulse 124 with desired characteristics at a surface 122 of the workpiece 120. For certain material processing applications, multiple temporally spaced-apart combined laser beam pulses 124 at the surface 122 are desired. Accordingly, each laser 102 can be operable to generate multiple sequential laser beam pulses 130 where each pulse is combined with a temporally-linked pulse from the other lasers to form a separate one of the multiple combined laser beam pulses 124 at the surface 122. The multiple combined laser beam pulses are targeted on a location on a work surface of the workpiece to process the workpiece.

Operation of the timing element 110, lasers 102, laser beam diagnostic elements 104, laser beam compensation elements 106, and laser beam position elements 108 can be controlled by a controller 112. The desired characteristics of the combined laser beam pulse 124 correspond with a desired processing of the workpiece 120. The desired processing can include modifying the workpiece 120 to form or inspect the workpiece. In some implementations, depending on the characteristics of the combined laser beam pulse 124, forming the workpiece 120 can include generating a shockwave that imparts localized compressive residual stresses in the workpiece, removes material from the workpiece, cuts the workpiece, etches the workpiece, marks the workpiece, or achieves other material formation processes. Similarly, in certain implementations, depending on the characteristics of the combined laser beam pulse 124, inspecting the workpiece 120 can include generating a shockwave through the workpiece such as for a laser bond inspection process.

As shown, the laser processing system 100 can include at least two and up to any number of lasers 102, which are identified as first through Nth lasers. According to some embodiments, the lasers 102 are identical. Each laser can be capable of generating a laser beam pulse 130 or output pulse characterized by, among other properties, a given waveform shape (e.g., power per unit time P(t) profile), which may be described by an equivalent duration, and, by integrating the P(t) profile over time, a pulse energy E. Accordingly each individual laser beam pulse 130 has an individual P(t) profile and energy E. In certain implementations, the lasers 102 are operable to generate laser beam pulses 130 having desired P(t) profiles with specified durations. In other words, the lasers 102 can be selectively controllable to adjust the P(t) profile and the energy E of the generated laser beam pulse 130. Similarly, in some implementations, the lasers 102 can be operable to generate laser beam pulses 130 having any of various P(t) profiles and energy E. Of course, in certain implementations, the P(t) profile and/or energy E of the laser beam pulse 130 generated by each laser may be fixed (e.g., not adjustable).

In some embodiments, the lasers 102 can be any of various commercially available lasers that emit laser beam pulses 130. For example, each laser 102 can be a solid state laser, such as a Nd:YAG (neodymium-doped yttrium aluminum garnet) laser. Alternatively, each laser can be one of various types of other lasers, such as gas lasers, chemical lasers, dye lasers, metal-vapor lasers, semiconductor lasers, and the like. In some implementations, the lasers 102 each produce a laser beam pulse 130 with an individual energy E of about 1-4 Joules and a P(t) profile with an individual duration of about 5-15 nano-seconds (nsec) at full-width half-maximum (FWHM). As used herein, and unless otherwise noted, the duration of a laser beam pulse, whether combined or individual, is the FWHM duration of the P(t) profile of the pulse. Each of the lasers 102 is capable of generating multiple, successive laser beam pulses at a given frequency (e.g., repetition rate), which in certain implementations, can be up to about 1,000 Hz.

The lasers 102 generate the laser beam pulses 130 based on trigger signals received from the timing element 110. The timing element 110 acts a sequencer to sequence or synchronize the relative timing of the laser beam pulses 130 generated by the lasers 102 based on a timing command 177 (see, e.g., FIG. 3) received from the controller 112. Generally, the timing command 177 corresponds with a desired temporal delay or offset between temporally-linked laser beam pulses 130 of a laser beam pulse set. As defined herein, a laser beam pulse set is the laser beam pulses 130 that are temporally linked by a desired temporal delay and combined to form a given combined laser beam pulse 124. For example, in the illustrated embodiment, the combined laser beam pulse 124 is formed by a laser beam pulse set that includes at least two laser beam pulses 130 each generated by a respective one of at least two of the first through Nth lasers 102. The combination of these laser beam pulses is incoherent because the sources are not phased with respect to each other. To ensure incoherent addition of the laser beam pulses, phase plates may be used to randomize the phase across the aperture of each source.

According to one implementation shown in FIG. 4A, which will be described in more detail below, a combined laser beam pulse 270 is formed from a laser beam pulse set that includes the four temporally-offset (e.g., temporally-linked by a desired temporal delay) laser beam pulses 262-268. The temporal offset between each of the laser beam pulses of a set can be the same or different. For example, in one implementation, the temporal offset between the first two pulses of a three pulse set can be different or the same as the temporal offset between the second and third pulses of the three pulse set.

The temporal offset between the laser beam pulses of a given set is necessary to produce a combined laser beam pulse with characteristics (e.g., P(t) profile and energy E) that effectuate a desired processing result on or in a workpiece. The P(t) profile and energy E of a combined laser beam pulse are dependent on the durations of each laser beam pulse of a set, the energy E of each laser beam pulse of the set, and the temporal offset between laser beam pulses of the set. Moreover, for a given P(t) profile and energy E of the laser beam pulses of a set, the P(t) profile of the combined laser beam pulse is equal to the combination of the P(t) profiles of the laser beam pulses, and changes as the temporal offset changes. The total energy of the combined beam does not change with the temporal offset. For example, the duration of a combined laser beam pulse may increase and decrease with increasing and decreasing, respectively, temporal offsets of the laser beam pulses of a set. In contrast, the peak of the P(t) profile of a combined laser beam pulse may increase and decrease with decreasing and increasing, respectively, of temporal offset of the laser beam pulses of the set. In yet some implementations, a combined laser beam pulse may be made up of individual laser beam pulses each having different P(t) profiles and/or energy E, with each laser beam pulse accomplishing a different material processing effect (e.g., short pulse laser for ionization and long pulse laser for melting or drilling) on the workpiece. Or alternatively, a combined laser beam may be made up of different types of laser beams, such as a combination of pulsed laser beams and non-pulsed or continuous laser beams.

Figure 4A:
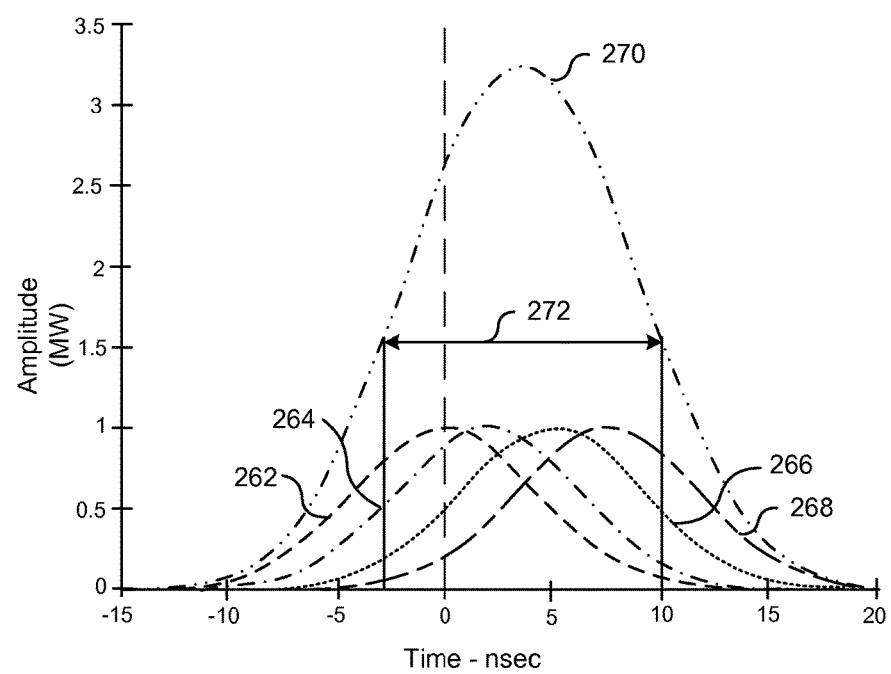
FIG. 4A is a chart showing P(t) amplitude-versus-time characteristics of multiple temporally sequenced laser beams combined incoherently to produce an equivalent combined laser beam according to one embodiment.

According to one implementation of a four pulse set shown in FIG. 4A, the temporal offsets between the four laser beam pulses 262-268 are different. For example, the temporal offset between the first laser beam pulse 262 and the second laser beam pulse 264 is about 2 nsec, the temporal offset between the second laser beam pulse 264 and the third laser beam pulse 266 is about 3 nsec, and the temporal offset between the third laser beam pulse 266 and the fourth laser beam pulse 268 is about 2.5 nsec. Correspondingly, the combined laser beam pulse 270 has a duration 272 of about 13 nsec, and, with each laser beam pulse 262-268 having a peak P(t) amplitude of about 1 megajoule/s or megawatt, a peak P(t) amplitude of about 3.25 megajoules/s or megawatts.

Figure 4B:
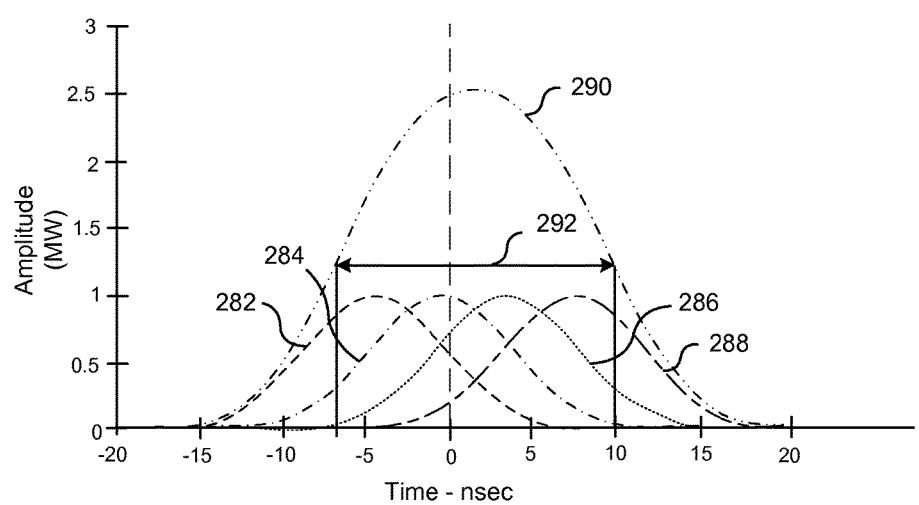
FIG. 4B is a chart showing P(t) amplitude-versus-time characteristics of multiple temporally sequenced laser beams combined incoherently to produce an equivalent combined laser beam according to another embodiment.

As another example of a four pulse set, and referring to FIG. 4B, like the laser beam pulses of FIG. 4A, the temporal offsets between the four laser beam pulses 282-288 forming the set of pulses that define the combined laser beam pulse 290 also are different. However, the temporal offsets of the laser beam pulses 282-288 are generally longer than those of the laser beam pulses 262-268. For example, the temporal offset between the first laser beam pulse 282 and the second laser beam pulse 284 is about 4 nsec, the temporal offset between the second laser beam pulse 284 and the third laser beam pulse 286 is about 3 nsec, and the temporal offset between the third laser beam pulse 286 and the fourth laser beam pulse 288 is about 4 nsec. Correspondingly, even though each laser beam pulse 282-288 has about the same peak P(t) amplitude (e.g., 1 megajoule/s) as the laser beam pulses 262-268, the combined laser beam pulse 290 has a duration 292 of about 17 nsec, and a peak P(t) amplitude of about 2.5 megajoules/s. Generally, the wider, or longer the duration of, a combined laser beam pulse, the lower the peak P(t) amplitude.

Figure 3:
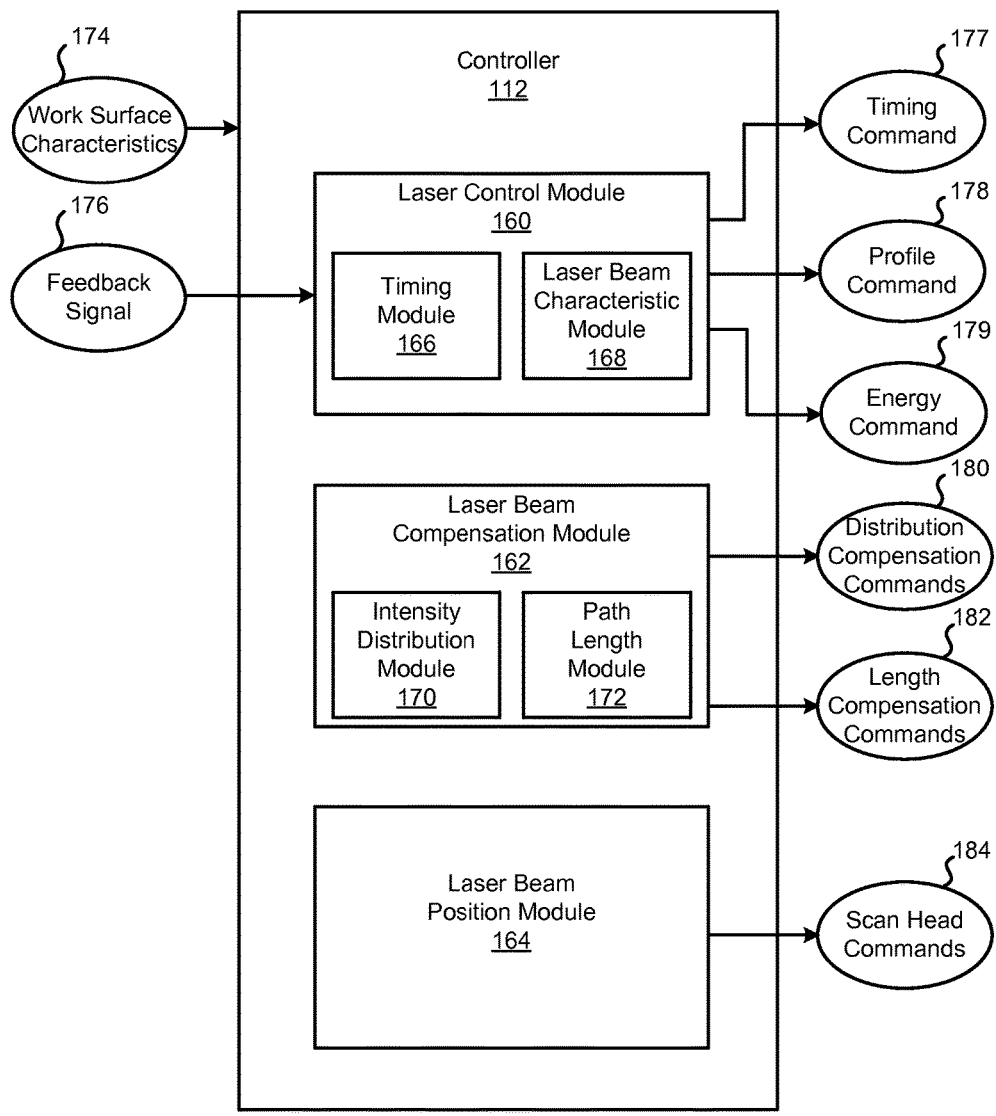
FIG. 3 is a schematic block diagram of a controller for a laser processing system according to one embodiment.

As mentioned above, temporal offsets between or sequential timing of the laser beam pulses of a given set of laser beam pulses is defined by the timing command 177. The timing command 177 can be determined by and received from the controller 112. Referring to FIG. 3, the controller 112 includes a laser control module 160 that controls the timing and characteristics of the laser beam pulses 130 generated by the lasers. The laser control module 160 includes a timing module 166 and a laser beam characteristic module 168. The timing module 166 is configured to determine the desired temporal offsets between the laser beam pulses 130 and to generate a timing command 177 representing the desired temporal offsets. The timing command 177 is then sent to the timing element 110, which triggers actuation of the lasers 102 to generate laser beam pulses 130 according to the desired temporal offsets. The desired temporal offsets are determined by the timing module 166 based on one or more inputs. The inputs can be any of various inputs, such as manually-generated or automatically-generated inputs associated with the type of laser processing to be performed, characteristics 174 of the workpiece 120, environmental conditions, and/or the like.

Figure 2:
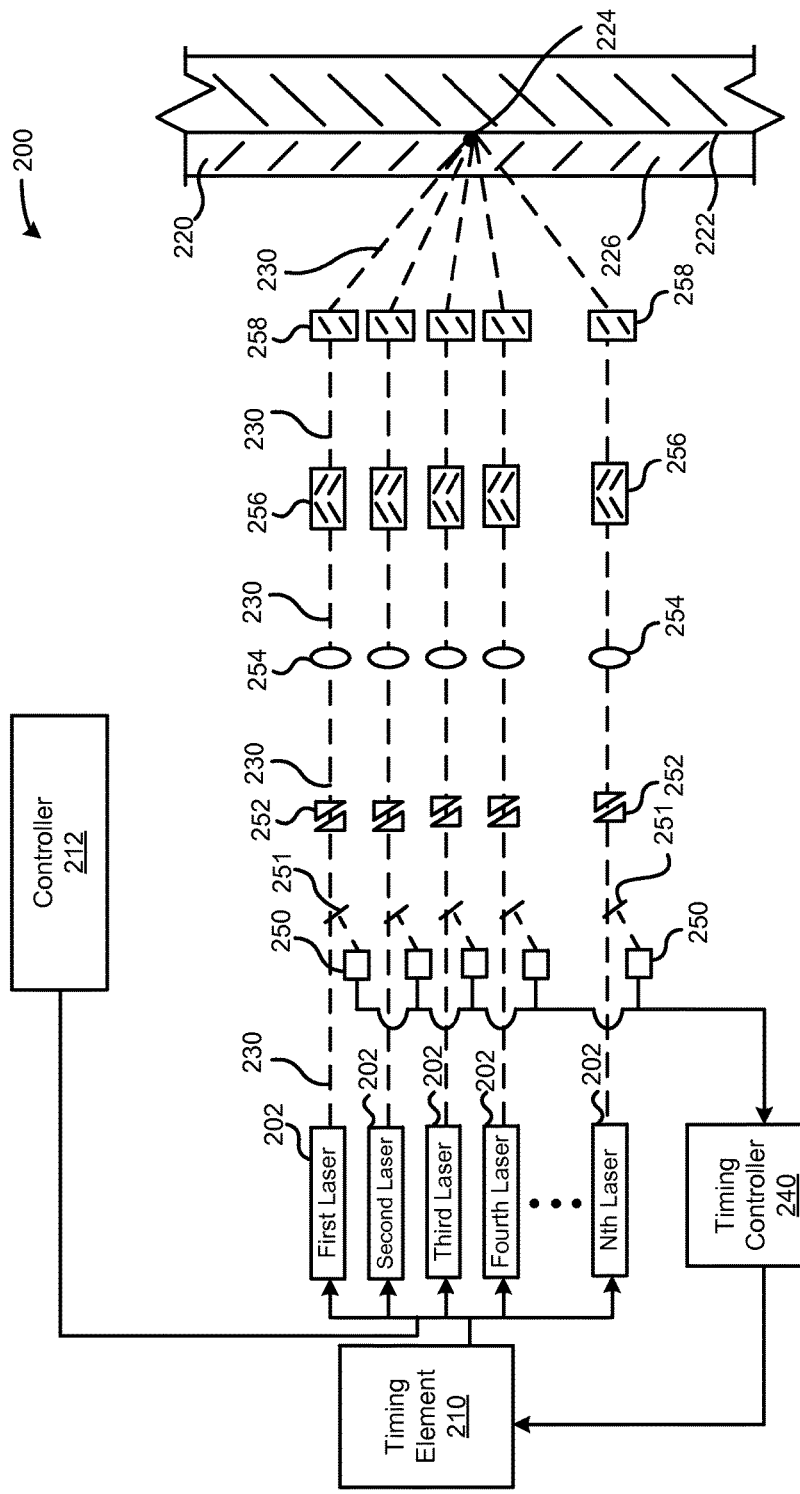
FIG. 2 is a schematic block diagram of a laser processing system for processing a material according to another embodiment.

Referring to FIG. 2, another embodiment of a laser processing system 200 for processing a workpiece 220 is shown. The laser processing system 200 includes some features that are analogous to the features of the laser processing system 100, with like numbers referring to like features. For example, the laser processing system 200 includes a plurality of lasers 202 that each generates a laser beam pulse 230. The laser processing system 200 also includes a controller 212 with modules similar to the modules of the controller 112. However, instead of controlling the timing of or temporal offset between the laser beam pulses 230 from the controller 212, the system 200 includes a separate timing controller 240 that communicates timing commands to the timing element 210. The timing controller 240 may have a timing module similar to the timing module 166 of the controller 112.

In addition to the temporal offset between laser beam pulses of a set, the characteristics of a combined laser beam pulse can be dependent on the P(t) profile and energy E of each laser beam pulse of the set. Moreover, as discussed above, in some embodiments, the lasers 102 are controllable to produce laser beam pulses with varying P(t) profiles and energy E. In this manner, the output of the lasers 102 may be adjustable in situ or on-the-fly. Accordingly, in certain embodiments, in addition or alternative to adjusting the temporal offset between laser beam pulses, the P(t) profile and/or energy E of each of the laser beam pulses 130 can be adjustable or modulated to change the characteristics of the combined laser beam pulse 124. However, it is noted, that in some embodiments, the lasers 102 are not equipped to produce a laser beam pulse having a variety of P(t) profiles and/or energies E, but rather are configured to produce a laser beam pulse having a fixed P(t) profile and/or energy E.

The P(t) profile and energy E of the laser beam pulse 130 produced by each of the lasers 102 can be adjusted by varying the input commands to the lasers. In some embodiments, the controller 112 transmits input commands to the lasers 102 to control the duration and amplitude of the lasers 102. For example, the laser beam characteristic module 168 is configured to determine a desired P(t) profile and/or energy E of the laser beam pulses 130. The laser beam characteristic module 168 also generates a profile command 178 representing the desired P(t) profile of the laser beam pulses 130, and an energy command 179 representing the desired energy E of the laser beam pulses. The profile and energy commands 178, 179 are then sent to the lasers 102, which generate respective laser beam pulses 130 according to the desired P(t) profile and energy E. According to some implementations, the desired P(t) profile and energy E for each of the laser beam pulses 130 of a given set are the same. But, in other implementations, the desired P(t) profile and energy E for each of the laser beam pulses 130 of a given set are different. The P(t) profile and energy E can be determined by the laser beam characteristic module 168 based on one or more inputs. The inputs can be any of various inputs, such as manually-generated or automatically-generated inputs associated with the type of laser processing to be performed, characteristics 174 of the workpiece 120, environmental conditions, and/or the like.

According to some embodiments, the actual temporal offset, pulse P(t) profile, and/or pulse energy E of the laser beam pulses 130 may be different than the desired temporal offset, pulse P(t) profile, and/or pulse energy E for a variety of factors, such as environmental conditions, system delays, underperformance, and the like. The laser beam diagnostic elements 104 receive the laser beam pulses 130 generated by the lasers 102, detect the actual characteristics of the laser beam pulses, and provide feedback indicating the actual characteristics to the controller 112 in the form of a feedback signal 176. The actual characteristics detected by the laser beam diagnostic elements 104 can include timing, P(t) profile (e.g., duration), and energy E. If necessary, the controller 112 adjusts the laser commands (e.g., timing command 177, profile command 178, and energy command 179) based on the feedback signal 176 such that the actual characteristics of the laser beam pulses 130 are the same as, or closer to, the desired characteristics. In certain implementations, the feedback signal 176 can be compared to preexisting data to determine the amount of adjustment to the laser commands that is needed.

Referring to the laser processing system 200 of FIG. 2, in some embodiments, the laser beam diagnostic elements 104 may be a plurality of detectors 250 and splitters 251. Each splitter 251 reflects a portion of a respective one of the laser beam pulses 230 back to a respective detector 250. The detector 250 includes detection or sensing elements capable of determining the actual characteristics of a laser beam pulse 230 based on the received portion of the laser beam pulse. The detectors 250 then send the detected characteristics of the laser beam pulses 230 to the timing controller 240 (or the controller 212) as a feedback signal 176.

According to some embodiments, the feedback signal 176 additionally, or alternatively, includes characteristics of the combined laser beam pulse 224 as detected by a detector (not shown) positioned at the surface of the workpiece 220 being processed. The feedback from the workpiece surface detector can then be used to adjust the laser commands.

Referring back to the laser processing system 100 of FIG. 1, the laser beam compensation elements 106 are configured to adjust certain characteristics of the laser beam pulses 130 based on various factors. According to some embodiments, the laser beam compensation elements 106 control the near field image of the laser beam pulses 130 based on a desired footprint of each laser beam pulse at the surface 122 of the workpiece 120. In certain implementations, due to an angle at which a laser beam pulse 130 is being projected onto the surface 122 of the workpiece 120 (e.g., angle of incidence), the intensity distribution (e.g., near field intensity profile or flux) of the laser beam pulse on the surface often is different than the intensity distribution of the laser beam pulse generated by the laser 102. Moreover, for proper processing of the workpiece, it may be desirable to have the intensity distribution of the laser beam pulse 130 on the surface of the workpiece 120 to be the same as the intensity distribution of the laser beam pulse generated by a laser 102. For example, in one implementation, a laser 102 may generate a laser beam pulse 130 with a circular-shaped beam (having a given intensity distribution), and the desired shape of the beam on the surface of the workpiece 120 also may be circular-shaped (having the same intensity distribution). In other words, for proper operation, it may be desirable to project the same circular beam shape onto the workpiece 120 as was generated by the laser in order to have the same intensity distribution on the surface of the work piece 120 as was generated by the laser 102. However, without reshaping the intensity distribution of the laser beam pulse 130 prior to being projected onto the workpiece 120, the angle of incidence of the pulse relative to the surface 122 of the workpiece may cause the circular beam (with a given intensity distribution) to be projected onto the surface as an elliptical beam (with a different intensity distribution). Accordingly, the laser beam compensation elements 106 reshape the near field image or spatial shape of the laser beam pulse 130 prior to being projected onto the surface 122 of the workpiece 120 such that the footprint or spatial shape of the laser beam pulse when projected onto the surface is circular, or the desired shape. Although the original and desired spatial shape of the laser beam pulse 130 is described in this implementation as circular, the original and/or desired spatial shape can be another shape, such as square, triangular, ovular, and the like.

Because the angle of incidence of each laser beam pulse 130 of a given set may be different, or due to uneven surfaces of the workpiece 120, the spatial shape of the laser beam pulses 130 can be modulated independently of each other such that each laser beam pulse has the same (or if desired a different) projected spatial shape onto the surface 122 of the workpiece 120. Accordingly, the laser beam compensation elements 106 can include separately controllable shaping optics for each of the laser beam pulses 130. The optics can be separately controllable by the controller 112. Referring to FIG. 3, the controller 112 includes a laser beam compensation module 162 with an intensity distribution module 170 and path length module 172. The intensity distribution module 170 is configured to generate distribution compensation commands 180 each representing desired adjustments to the intensity distribution (i.e., spatial shape) of a respective laser beam pulse 130. The distribution compensation commands 180 can be based on any of various inputs, such as a measured or predicted angle of incidence of each laser beam pulse 130, which can depend on the elevational characteristics of the workpiece and the location of the combined laser beam pulse 124 on the workpiece. Upon receipt of an intensity distribution compensation command 180 from the controller 112, the laser beam compensation elements 106 are actuated to achieve the desired intensity distribution adjustments.

According to one embodiment, the compensation elements of the system 200 of FIG. 2 include a plurality of individually controllable optics each associated with a respective one of the laser beam pulses 230. As shown, the optics may include beam-shaping prisms and optical lenses. However, in other embodiments, any of various other optics, for example, cylindrical lenses, can be used to adjust the spatial shape of the laser beam pulses 230. In the illustrated embodiment, each laser beam pulse 230 is shaped by at least one anamorphic prism pair 252 in series with at least one optical lens 254, which can be a convex optical lens. The prism 252 in some embodiments includes two prisms in series that are adjustable via an on-axis rotation and tilt relative to each other to achieve a desired adjustment to the spatial shape of the laser beam pulse 230. In general, optical lenses can be a group of lenses that relay the intensity distribution of the individual laser pulse to the workpiece with appropriate optical magnification, if desired. Each prism 252 (or prism pair) and optical lens 254 (or multiple lenses) in series receive a respective laser beam pulse 230, and, depending on the configuration of the prism and optical lens, reshapes or reimages the laser beam pulse. Each prism 252 or prism pair acts to define a spatial shape of a respective laser beam pulse independent of the position of the pulse on the workpiece. In contrast, each optical lens 254 acts to relay exit waist of a given laser beam pulse to provide a desired size of the beam and to smooth the edge of the beam. The configuration of the prism 252 and optical lens 254 can be adjustable to adjust the shape of the laser beam pulse 230 passing therethrough. For example, in one embodiment, the controller 212 can be configured to generate distribution compensation commands 180 and send the commands to the prisms 252 and optical lenses 254.

Referring back to FIG. 1, according to some embodiments, the laser beam compensation elements 106 may also be configured to adjust the path length of the laser beam pulses 130 based on differences between the actual physical path lengths each laser beam pulse must travel to reach the surface 122 of the workpiece 120. Similar to causing beam shape discrepancies, differences in the angle of incidence of laser beam pulses 130 projected onto the surface 122 of the workpiece 120 may cause the physical path lengths of the laser beam pulses 130 to be different. The path length of a laser beam pulse 130 can be defined as the distance the laser beam pulse travels from a common origination point to the surface 122 of the workpiece 120. The common origination can be the output of the laser 102 or some other location along the path that is common among the laser beam pulses 130 (e.g., the optical lenses 254). For proper processing of the workpiece, it likely is desirable for each of the laser beam pulses 130 to arrive at the surface 122 of the workpiece 120 according to the desired temporal offset. An increase or decrease in the path length of one laser beam pulse 130 in a set relative to another in the set would disrupt the desired temporal offset and degrade the shape and sharpness of the intensity distribution of the laser beam pulse at the workpiece. Further, because the desired temporal offset may be in the nano-second regime, the desired offset between each laser beam pulse 130 in time could be affected by the "time of flight" of uncorrected path lengths. Accordingly, the laser beam compensation elements 106 are configured to increase or decrease as necessary the path lengths of one or more of the laser beam pulses 130 of a set such that the path lengths of all the laser beam pulses are the same or fixed. In some embodiments, the controller may be configured to adjust for the variability of the path lengths of laser beam pulses 130 of a given set via the timing command 177.

The laser beam compensation elements 106 can include separately controllable path lengthening elements for each of the laser beam pulses 130. The path lengthening elements can be separately controllable by the controller 112. Referring to FIG. 3, the path length module 172 of the controller 112 is configured to generate length compensation commands 182 each representing desired adjustments to the path length of a respective laser beam pulse 130. The length compensation commands 182 can be based on any of various inputs, such as a measured or predicted path length of each laser beam pulse 130, which can depend on the elevational characteristics of the workpiece and the location of the combined laser beam pulse 124 on the workpiece. Upon receipt of a length compensation command 182 from the controller 112, the laser beam compensation elements 106 are actuated to achieve the desired path length adjustments.

According to one embodiment, the modulating elements of the system 200 of FIG. 2 include a plurality of individually controllable path lengthening elements 256 each associated with a respective one of the laser beam pulses 230. As shown, each path lengthening element 256 may be an optical trombone. Generally, an optical trombone includes two stationary mirrors and two translational minors. The laser beam pulse 230 reflects off all four mirrors before exiting the trombone. The translational mirrors translationally move relative to the stationary minors to lengthen or shorten the path length of the laser beam pulse 130. In other embodiments, any of various other path lengthening devices can be used to independently adjust the path lengths of the laser beam pulses 230. In one embodiment, the controller 212 can be configured to generate length compensation commands 182 and send the commands to the path lengthening elements 256.

Again referring back to FIG. 1, according to some embodiments, the laser processing system 100 includes laser beam position elements 108 configured to adjustably control the direction of the laser beam pulses 130 toward the surface 122 of the workpiece 120. Depending on the type of processing to be performed on the workpiece 120, the position of the laser beam pulses 130 on the surface 122 of the workpiece 120 may be different. For example, for many processing types, each of the laser beam pulses 130 converge or are coincident on a single point on the surface 122. In such implementations, the combined laser beam pulse 124 can be defined as the point of convergence or coincidence on the surface 122. However, for some processing types, each of the laser beam pulses 130 converge or are coincident on different spaced-apart points on the surface 122 of the workpiece 120. In such implementations, the multiple laser beam pulses 130 can still be used cooperatively to form shockwaves that work together inside the workpiece. Additionally, or alternatively, in such implementations, the multiple laser beam pulses 130 hitting multiple different locations on the surface of the workpiece can increase the effective rate of a desired process.

The laser beam position elements 108, which can be scan heads, effectively redirect the laser beam pulses 130 from an initial trajectory into a final trajectory. As shown in FIG. 1, the initial trajectories of the laser beam pulses 130 may be in the same general direction (i.e., parallel to each other). Accordingly, the final trajectories of each of the laser beam pulses 130 are different to converge the pulses at a single point or area on the workpiece 120. For this reason, the laser beam position elements 108 can include separately controllable path redirection elements for each of the laser beam pulses 130. The path redirection elements can be separately controllable by the controller 112. Referring to FIG. 3, a laser beam position module 164 of the controller 112 is configured to generate scan head commands 184 each representing desired adjustments to the path trajectory of a respective laser beam pulse 130. The scan head commands 184 can be based on any of various inputs, such as the position of the workpiece relative to the laser beam position elements 108. Upon receipt of a scan head command 184 from the controller 112, the laser beam position elements 108 are actuated to achieve the desired adjustments to the path trajectories of the laser beam pulses 130.

According to one embodiment, the laser beam position elements of the system 200 of FIG. 2 include a plurality of individually controllable scan heads 258 each associated with a respective one of the laser beam pulses 230. As shown, each scan head 258 may be an x-y optical scan head known in the art. Generally, an x-y optical type of scan head 258 includes two minors on orthogonal axes. The position of each minor is adjustable via actuation of a respective driver, such as a galvanometer. The relative positions of the mirrors determine the final trajectory of a laser beam pulse 230. A laser beam pulse 230 enters the scan head 258 at an initial trajectory, and reflects off the two minors before exiting the scan head at a final trajectory. Although x-y scan heads are described, in other embodiments, any of various other laser beam position elements can be used to independently adjust the trajectories or directions of the laser beam pulses 230. In one embodiment, the controller 212 can be configured to generate scan head commands 184 and send the commands to the scan heads 258.

The workpieces processed by the laser processing systems of the present disclosure can be made from any of various materials, have any of various thicknesses and shapes, and form part of any of various structures. In some implementations, the workpiece is made from a metallic material and the laser processing system is used to form the workpiece. Formation of the metallic workpiece can include peening the surface of the workpiece. According to one embodiment, to facilitate peening of the surface of the metallic workpiece, an overlay 226 or confining layer positioned on the surface of the workpiece (see, e.g., FIG. 2). Generally, the overlay 226 can be configured to allow the laser beam pulses 230 to penetrate the overlay, but confine the energy of the laser beam pulses on the surface 222 of the workpiece 220. The confinement of the energy assists in more efficiently producing a shockwave that induces structural changes in the workpiece, such as imparting compressive residual stresses within the workpiece. According to yet some implementations, the workpiece is made from a composite material and the laser processing system is used to inspect the workpiece.

Figure 5:
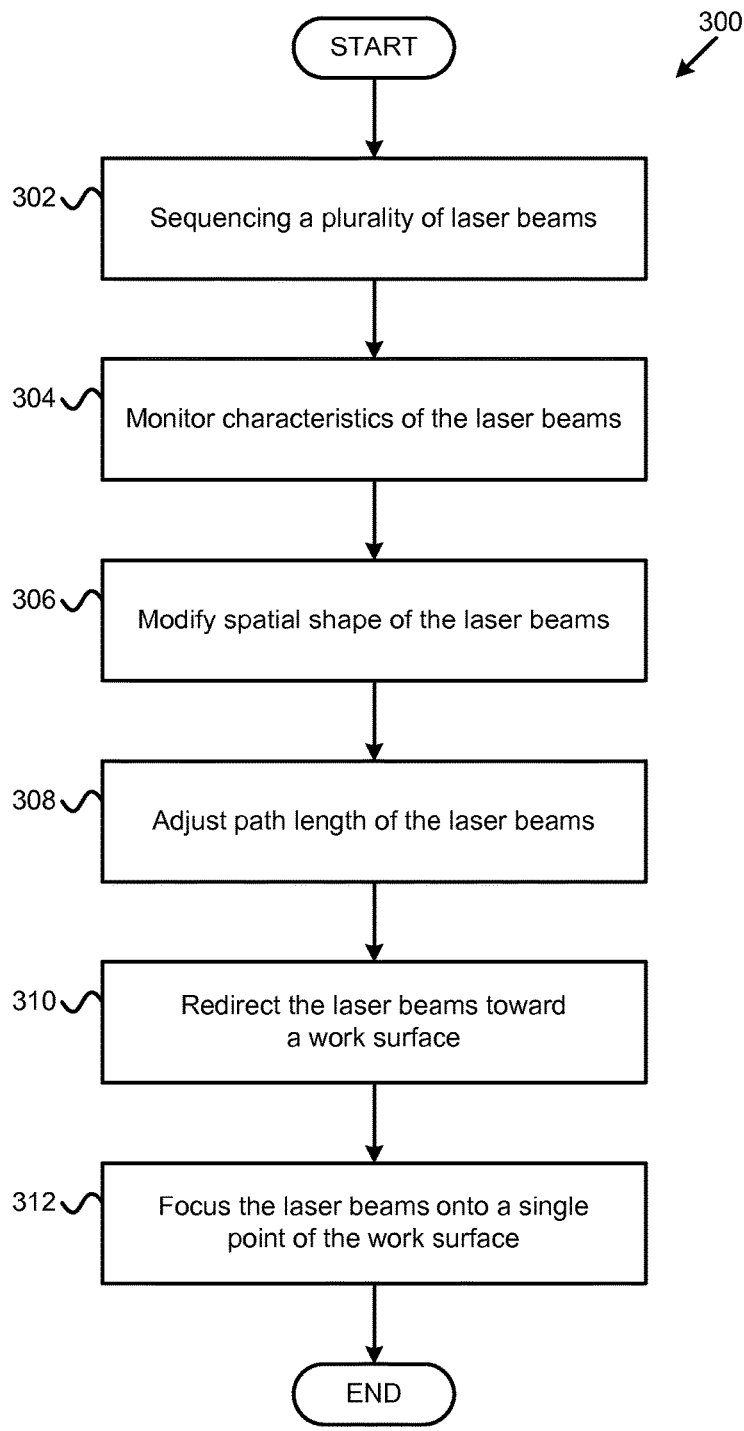
FIG. 5 is a schematic flow diagram of a method for laser processing a material according to one embodiment.

Referring to FIG. 5, and according to one embodiment, a method 300 for processing a workpiece is shown. In certain implementations, the method 300 is executed by one or more laser processing systems described herein. The method 300 includes sequencing a plurality of laser beams or laser beam pulses at 302. In some implementations, sequencing the plurality of laser beams at 302 includes temporally offsetting the generation of a set of laser beams. The method 300 further includes monitoring the characteristics of the laser beams at 304. In some implementations, monitoring the characteristics of the laser beams at 304 includes using the monitored characteristics as feedback for sequencing a plurality of laser beams in a subsequent execution of the method 300. The method 300 additionally includes modifying the spatial shape (e.g., intensity distribution) of the laser beams at 306 and modifying the path length of the laser beams at 308. Further, the method 300 includes redirecting the laser beams toward a work surface, such as the surface of a workpiece, at 310. Also, the method 300 includes focusing or combining the laser beams onto a single point or area of the work surface to process the work surface at 312.

Figure 6:
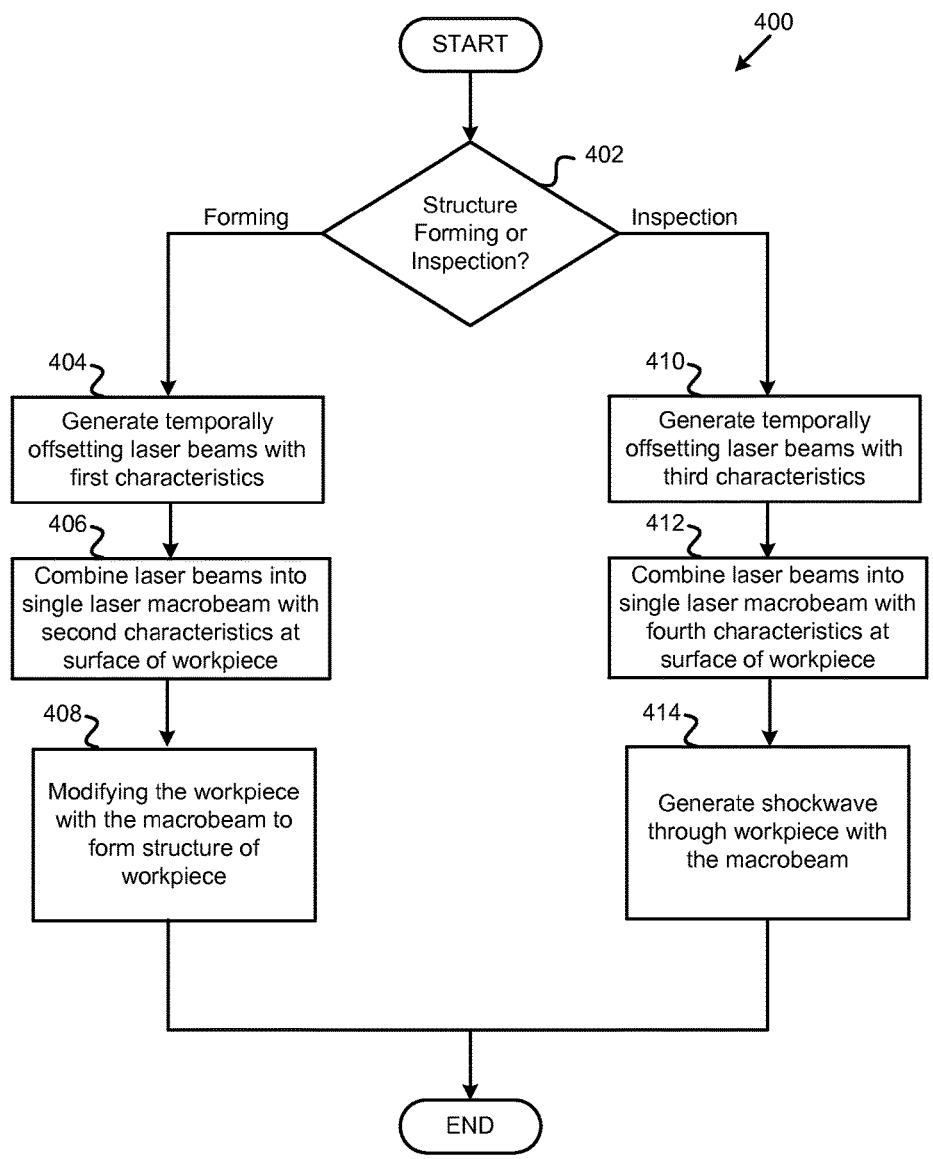
FIG. 6 is a schematic flow diagram of a method for laser processing a material according to yet another embodiment.

According to another embodiment shown in FIG. 6, a method 400 for processing a workpiece, which can be executed by one or more laser processing systems describe herein, includes determining whether a forming or inspection process is desired at 402. If a forming process is desired at 402, then the method 400 proceeds to generate temporally offsetting laser beams having first characteristics at 404. The temporally offsetting laser beams with the first characteristics are combined into a single laser macrobeam (e.g., combined laser beam pulse) with second characteristics at 406, and the method 400 modifies the workpiece with the macrobeam having second characteristics at 408. If an inspection process is desired at 402, then the method 400 proceeds to generate temporally offsetting laser beams having third characteristics at 410. The temporally offsetting laser beams with the third characteristics are combined into a single laser macrobeam with fourth characteristics at 412, and the method 400 inspects the workpiece using a shockwave induced by the macrobeam having fourth characteristics at 414. In some implementations, the first and third characteristics are different, and the second and fourth characteristics are different.

Although the laser processing systems of the present disclosure have been described above with reference to laser beam pulses or pulsed laser beams, in some embodiments, certain benefits may be derived from combining non-pulsed or continuous laser beams in the same or similar manner as described above.

Figure 7:
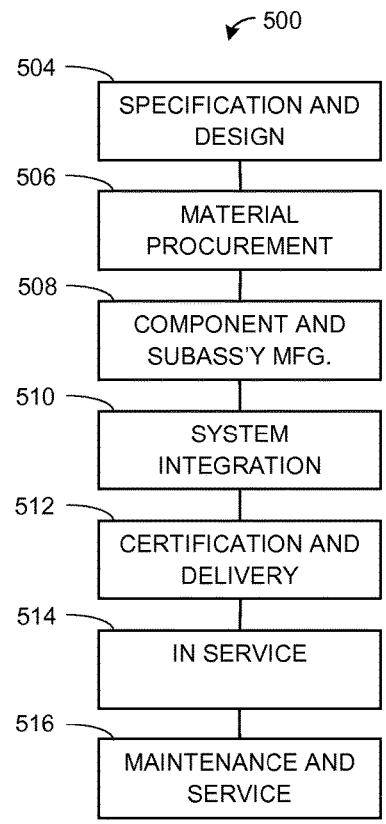
FIG. 7 is a flow diagram of aircraft production and service methodology.
Figure 8:
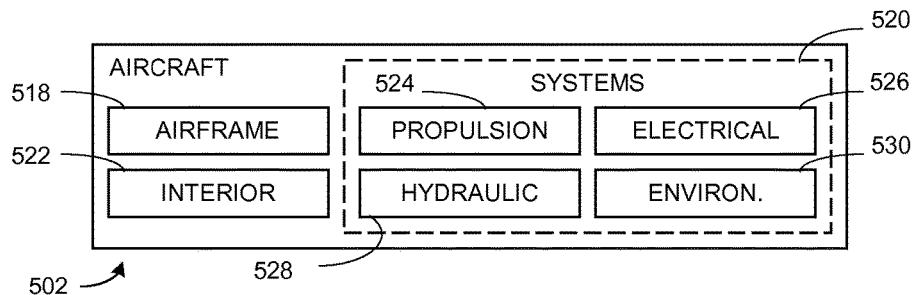
FIG. 8 is a block diagram of an aircraft.

Referring more particularly to the drawings, embodiments of the disclosure may be described in the context of an aircraft manufacturing and service method 500 as shown in FIG. 7 and an aircraft 502 as shown in FIG. 8. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (e.g., LabVIEW). The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for processing a workpiece, comprising:
a plurality of lasers each producing a laser beam pulse;
a controller comprising a laser control module configured to generate a timing command and to send the timing command to a timing element that communicates a trigger signal, in response to the timing command, to each laser of the plurality of lasers, wherein each laser is configured to produce the laser beam pulse in response to receiving the trigger signal;
laser beam compensation elements comprising shaping optics for each of the laser beam pulses, the shaping optics being separately controllable by the controller, wherein the shaping optics for any respective one of the laser beam pulses are configured to adjust a shape of a respective one of the laser beam pulses, a near field intensity profile of the respective one of the laser beam pulses, and a path length of the respective one of the laser beam pulses;
laser beam position elements, receiving the laser beam pulses from the laser beam compensation elements and comprising path redirection elements for said each of the laser beam pulses, the path redirection elements being separately controllable by the controller, wherein the path redirection elements for any respective one of the laser beam pulses are configured to adjust a direction of the respective one of the laser beam pulses toward a surface of the workpiece such that the laser beam pulses converge toward each other and impact the surface of the workpiece;

the laser control module further configured to control a timing of the trigger signal communicated to each laser of the plurality of lasers for controlling a timing of a production of the laser beam pulses;

a laser beam compensation module of the controller configured to communicate with the laser beam compensation elements to control adjustment of the shaping optics for separately adjusting:

a shape of each laser beam pulse such that the shapes of the laser beam pulses away from the surface of the workpiece are different and the shapes of the laser beam pulses at the surface of the workpiece are the same; and path lengths of the laser beam pulses differently such that the path lengths of the laser beam pulses are the same; and a laser beam position module of the controller configured to communicate with the laser beam position elements to control adjustment of the path redirection elements for adjusting a direction of the laser beam pulses to converge toward the surface of the workpiece so that the laser beam pulses produce a combined laser beam pulse at the surface of the workpiece.

2. The system of claim 1, wherein said each laser beam pulse has a first energy, the combined laser beam pulse having a second energy greater than the first energy, and wherein the laser control module controls temporal characteristics and sequencing of the laser beam pulses based on a desired second energy of the combined laser beam pulse.

3. The system of claim 2, wherein the first energy of said each laser beam pulse is the same.

4. The system of claim 2, wherein the first energy of at least one of the laser beam pulse is different than the first energy of at least one other of the laser beam pulses.

5. The system of claim 1, wherein controlling the timing of the production of the laser beam pulses comprises temporally delaying the production of the laser beam pulses relative to each other.

6. The system of claim 5, wherein a delay between the laser beam pulses is set according to at least one of a desired duration and peak power P(t) of the combined laser beam pulse.

7. The system of claim 1, wherein the laser beam position module is configured to communicate with the laser beam position elements to control adjustment of the laser beam position elements for adjusting the direction of the laser beam pulses toward the surface of the workpiece so that the laser beam pulses converge at a single point on the surface of the workpiece.

8. The system of claim 1, further comprising a confining material overlaying the surface of the workpiece, wherein the confining material facilitates a peening of the workpiece.

9. The system of claim 1, wherein the laser beam position elements comprise a plurality of scan heads.

10. The system of claim 1, further comprising at least one laser beam diagnostic element that detects at least one characteristic of the laser beam pulses, wherein the laser control module adjusts sequencing of temporal characteristics of the laser beam pulses based at least partially on the at least one characteristic detected by the at least one laser beam diagnostic element.

11. The system of claim 10, wherein the at least one characteristic of the laser beam pulses detected by the at least one laser beam diagnostic element comprises a power output.

12. An apparatus for controlling processing of a workpiece, comprising:

a laser control module configured to generate a timing command and send the timing command to a timing element that communicates trigger signals, in response to the timing command, to a plurality of lasers that generate a plurality of temporally-delayed laser beam pulses in response to the trigger signals, wherein generation of the plurality of temporally-delayed laser beam pulses by the plurality of lasers is delayed relative to each other;

a laser beam compensation module that commands shaping optics to control:

a spatial shape of each temporally-delayed laser beam pulse such that shapes of the plurality of temporally-delayed laser beam pulses away from a surface of the workpiece are different and shapes of the plurality of temporally-delayed laser beam pulses at the surface of the workpiece are the same; and path lengths of the plurality of temporally-delayed laser beam pulses differently such that the path lengths of the plurality of temporally-delayed laser beam pulses are the same; and a laser beam position module that commands path redirection elements to control a redirection of each pulse of the plurality of temporally-delayed laser beam pulses, individually and separately from each other, and while the plurality of temporally-delayed laser beam pulses are separated from each other, towards a surface of the workpiece to converge, incoherently relative to each other, at the surface of the workpiece.

13. The system of claim 1, wherein the laser beam pulses received by the laser beam position elements are parallel to each other.

14. The system of claim 1, wherein the directions of the laser beam pulses received by the laser beam compensation elements are the same as the directions of the laser beam pulses received by the laser beam position elements.

* * * * *